US011433873B2

(12) United States Patent
Ito et al.

(10) Patent No.: US 11,433,873 B2
(45) Date of Patent: Sep. 6, 2022

(54) VEHICLE HAVING CONTROLLER CONFIGURED TO CHANGE AN OPERATING POINT OF A TRAVELING ELECTRIC MOTOR

(71) Applicant: HONDA MOTOR CO., LTD., Tokyo (JP)

(72) Inventors: Yoshihiro Ito, Wako (JP); Ken Kitaori, Wako (JP); Masanari Fukuchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 322 days.

(21) Appl. No.: 16/718,228

(22) Filed: Dec. 18, 2019

(65) Prior Publication Data

US 2020/0231135 A1 Jul. 23, 2020

(30) Foreign Application Priority Data

Jan. 21, 2019 (JP) .............................. JP2019-007879

(51) Int. Cl.
*B60W 20/15* (2016.01)
*B60W 30/194* (2012.01)
(Continued)

(52) U.S. Cl.
CPC .............. *B60W 20/15* (2016.01); *B60K 6/28* (2013.01); *B60K 6/36* (2013.01); *B60K 11/00* (2013.01);
(Continued)

(58) Field of Classification Search
CPC .............. B60L 58/12; B60L 2240/425; B60L 2240/445; B60L 2240/485; F16H 57/0412;
(Continued)

(56) References Cited

U.S. PATENT DOCUMENTS

| 6,320,274 B1 * | 11/2001 | Goetze ...................... H02J 1/08 307/9.1 |
| 2003/0196631 A1 * | 10/2003 | Dehrmann .............. B60L 50/10 123/192.1 |

(Continued)

FOREIGN PATENT DOCUMENTS

| DE | 102011115279 A1 * | 12/2012 | ......... F16H 57/0413 |
| DE | 102012208419 A1 * | 11/2013 | ............ B60W 20/00 |

(Continued)

OTHER PUBLICATIONS

EPO machine translation or JP 2011-125121 A (original JP document published Jun. 23, 2011) (Year: 2011).*
(Continued)

*Primary Examiner* — David A Testardi
(74) *Attorney, Agent, or Firm* — Amin, Turocy & Watson, LLP

(57) ABSTRACT

A vehicle includes a gear mechanism connected to a driving wheel; a traveling electric motor configured to exchange heat with a heat exchange medium shared by the gear mechanism and output motive power to the driving wheel via the gear mechanism; and a controller configured to change an operating point of the traveling electric motor to a stronger field side rather than a maximum efficiency point in a case that a temperature of the heat exchange medium is less than a predetermined temperature.

3 Claims, 8 Drawing Sheets

(51) Int. Cl.
| | |
|---|---|
| *B60W 20/10* | (2016.01) |
| *B60K 6/36* | (2007.10) |
| *F16H 57/04* | (2010.01) |
| *B60L 58/12* | (2019.01) |
| *B60K 6/28* | (2007.10) |
| *B60W 10/06* | (2006.01) |
| *B60W 10/08* | (2006.01) |
| *B60K 11/00* | (2006.01) |
| *B60K 6/48* | (2007.10) |
| *B60K 6/46* | (2007.10) |
| *B60K 6/44* | (2007.10) |

(52) U.S. Cl.
CPC ............. *B60L 58/12* (2019.02); *B60W 10/06* (2013.01); *B60W 10/08* (2013.01); *B60W 20/10* (2013.01); *B60W 30/194* (2013.01); *F16H 57/0412* (2013.01); *F16H 57/0413* (2013.01); *B60K 6/44* (2013.01); *B60K 6/46* (2013.01); *B60K 6/48* (2013.01); *B60L 2240/485* (2013.01); *B60W 2510/087* (2013.01); *B60W 2510/107* (2013.01); *B60W 2510/244* (2013.01); *B60W 2710/06* (2013.01); *B60W 2710/08* (2013.01); *B60Y 2200/92* (2013.01); *B60Y 2300/91* (2013.01)

(58) Field of Classification Search
CPC ... F16H 57/0413; B60W 20/10; B60W 20/15; B60W 30/194; B60W 2510/0676; B60W 2510/087; B60W 2510/107; H02P 21/00; H02P 21/50; H02P 29/62
See application file for complete search history.

(56) References Cited

U.S. PATENT DOCUMENTS

| | | | | |
|---|---|---|---|---|
| 2009/0026999 | A1* | 1/2009 | Atarashi | H02P 21/0089 318/720 |
| 2011/0095717 | A1* | 4/2011 | Takizawa | B60L 3/0061 318/473 |
| 2012/0090905 | A1* | 4/2012 | Vollmer | B60H 1/00392 180/65.1 |
| 2012/0200241 | A1* | 8/2012 | Kojima | H02P 21/06 318/139 |
| 2012/0203404 | A1* | 8/2012 | Mituta | B60L 58/25 701/22 |
| 2013/0046425 | A1* | 2/2013 | Sime | B60L 7/10 701/22 |
| 2013/0152892 | A1* | 6/2013 | Hawkins | H02P 29/62 123/142.5 E |
| 2015/0217645 | A1* | 8/2015 | Imamura | B60L 53/00 701/22 |
| 2015/0251650 | A1* | 9/2015 | Nishiyama | B60W 30/194 701/22 |
| 2016/0214487 | A1* | 7/2016 | Anderson | B60L 50/10 |
| 2017/0036671 | A1* | 2/2017 | Fukuchi | B60W 10/30 |
| 2017/0257055 | A1* | 9/2017 | Kitaori | B60L 58/20 |
| 2017/0282751 | A1* | 10/2017 | Fukuchi | B60L 7/18 |
| 2017/0294865 | A1* | 10/2017 | Inokuma | B60L 15/20 |
| 2018/0083566 | A1* | 3/2018 | Lim | H02P 29/64 |
| 2018/0257637 | A1* | 9/2018 | Fukuchi | B60W 10/30 |
| 2018/0287538 | A1* | 10/2018 | Nakashima | B62D 5/0463 |
| 2018/0345793 | A1* | 12/2018 | Nishiyama | H02P 29/68 |
| 2019/0048990 | A1* | 2/2019 | Lasch | F16H 57/0476 |
| 2022/0077518 | A1* | 3/2022 | Ling | H01M 10/635 |

FOREIGN PATENT DOCUMENTS

| | | | | |
|---|---|---|---|---|
| DE | 102015219870 A1 | * | 4/2017 | ............. B60K 6/48 |
| JP | 2005348535 A | * | 12/2005 | |
| JP | 2006-288141 | | 10/2006 | |
| JP | 2011-125121 | | 6/2011 | |
| JP | 2011125121 A | * | 6/2011 | |
| JP | 2014-117006 | | 6/2014 | |
| JP | 2014225999 A | * | 12/2014 | |
| JP | 2014230434 A | * | 12/2014 | ............. B60W 20/00 |
| JP | 2015-085856 | | 5/2015 | |
| JP | 2015-159679 | | 9/2015 | |
| JP | 2016163399 A | * | 9/2016 | ......... F16H 57/0413 |
| JP | 2016178822 A | * | 10/2016 | |
| JP | 2017-030672 | | 2/2017 | |
| JP | 2018-188112 | | 11/2018 | |
| KR | 2014078428 A | * | 6/2014 | |
| WO | WO-2016052233 A1 | * | 4/2016 | ............. H02P 21/00 |

OTHER PUBLICATIONS

Miao, Dong-Min et al., "Simulation and analysis of a variable speed permanent magnet synchronous generator with flux weakening control", 2012 International Conference on Renewable Energy Research and Applications (ICRERA), Nagasaki, Japan, Nov. 11-14, 2012, 6 pages (Year: 2012).*

KIPO machine translation of KR 1020140078428 (original KR document published Jun. 25, 2014) (Year: 2014).*

Japanese Office Action for Japanese Patent Application No. 2019-007879 dated May 11, 2021.

Japanese Office Action for Japanese Patent Application No. 2019-007879 dated Oct. 27, 2020.

* cited by examiner

VEHICLE HAVING CONTROLLER CONFIGURED TO CHANGE AN OPERATING POINT OF A TRAVELING ELECTRIC MOTOR

CROSS-REFERENCE TO RELATED APPLICATION

Priority is claimed on Japanese Patent Application No. 2019-007879, filed Jan. 21, 2019, the content of which is incorporated herein by reference.

BACKGROUND

Field of the Invention

The present invention relates to a vehicle.

Description of Related Art

In the related art, a technology for determining whether warming-up is necessary or unnecessary based on the temperature of a heat exchange medium (lubricant) of a transmission delivering motive power of an internal combustion engine and an electric motor or generator to wheels in a hybrid vehicle in which the internal combustion engine and the electric motor or generator are combined has been disclosed (for example, Japanese Unexamined Patent Application, First Publication No. 2015-85856). Japanese Unexamined Patent Application, First Publication No. 2015-85856 discloses that a lubricant is stirred by causing an electric motor or generator to drive a transmission so that the temperature is increased when it is determined that warming-up is necessary.

A technology for realizing high noise vibration (NV) performance by changing an operating point so that a transmission (a motor generator) is driven as an inefficient operating point even when a capacitor of a hybrid vehicle is in a state in which the hybrid vehicle cannot be charged with regenerative electric power has been disclosed (for example, Japanese Unexamined Patent Application, First Publication No. 2017-30672).

SUMMARY

In the technologies of the related art, however, there is a possibility of an increase in temperature due to stirring being mild and a required time being longer until the temperature of a lubricant reaches a desired temperature.

The present invention is devised in view of such circumstances and an objective of the present invention is to provide a vehicle capable of increasing the temperature of a lubricant of a transmission faster during a cold period.

A vehicle according to the present invention adopts the following configurations.

(1) According to an aspect of the present invention, a vehicle includes: a gear mechanism connected to a driving wheel; a traveling electric motor configured to exchange heat with a heat exchange medium shared by the gear mechanism and output motive power to the driving wheel via the gear mechanism; and a controller configured to change an operating point of the traveling electric motor to a stronger field side rather than a maximum efficiency point in a case that a temperature of the heat exchange medium is less than a predetermined temperature.

(2) The vehicle according to the aspect (1) may further include a storage battery configured to be charged from outside of the vehicle and supply power to the traveling electric motor. The controller may change the operating point to the stronger field side rather than the maximum efficiency point in a case that the temperature of the heat exchange medium is less than the predetermined temperature and a charge amount of the storage battery is equal to or greater than a predetermined amount.

(3) The vehicle according to the aspect (1) may further include an internal combustion engine. The controller may change the operating point to the stronger field side rather than the maximum efficiency point in a case that the temperature of the heat exchange medium is less than the predetermined temperature and the internal combustion engine stops.

(4) The vehicle according to the aspect (1) may further include: an internal combustion engine; and a second electric motor which is connected to the internal combustion engine and which undergoes heat exchange with the heat exchange medium. The controller may change the operating point of the second electric motor to the stronger field side rather than the maximum efficiency point in a case that the temperature of the heat exchange medium is less than the predetermined temperature.

(5) The vehicle according to the aspect (1) may further include: an internal combustion engine; and a second electric motor which is connected to the internal combustion engine and which undergoes heat exchange with the heat exchange medium. The controller may change operating points of the second electric motor and the traveling electric motor to the stronger field side rather than the maximum efficiency point in a case that the second electric motor rotates the internal combustion engine.

(6) In the vehicle according to the aspect (3), the internal combustion engine and the traveling electric motor may be disposed adjacent to each other. The controller may allow heat to be exchanged between the heat exchange medium of the internal combustion engine and the heat exchange medium of the traveling electric motor.

According to the foregoing aspects (1) to (6), it is possible to increase the temperature of a heat exchange medium of a transmission faster than at a cold time.

DESCRIPTION OF EMBODIMENTS

Hereinafter, embodiments of a vehicle according to the present invention will be described with reference to the drawings.

[Overall Configuration]

Figure 1:
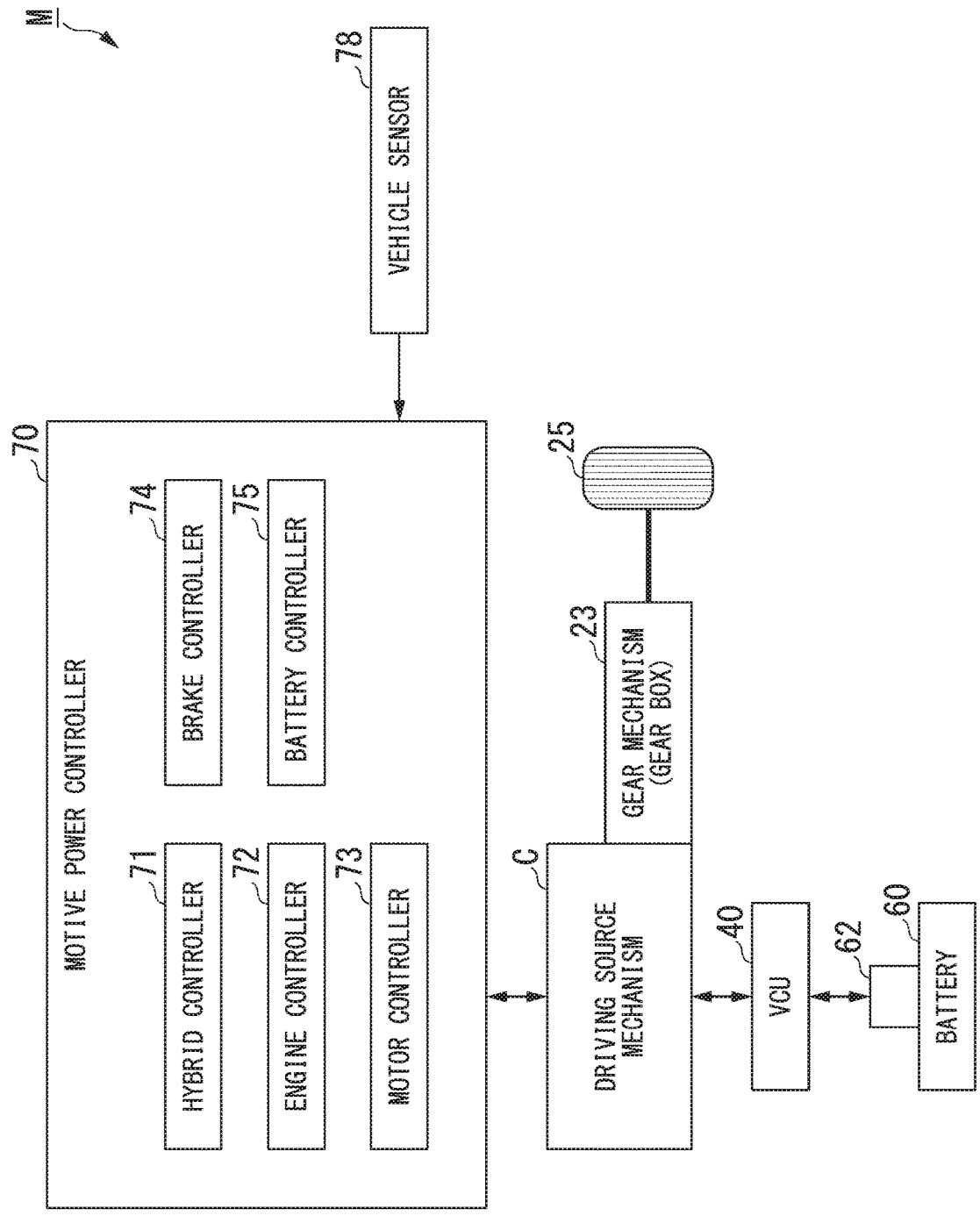
FIG. 1 is a diagram showing a functional configuration of a vehicle.

FIG. 1 is a diagram showing a functional configuration of a vehicle M. The vehicle M is, for example, a two-wheeled, three-wheeled, or four-wheeled hybrid vehicle. A driving source of the vehicle M is a combination of an electric motor and an internal combustion engine such as a diesel engine or a gasoline engine. In a case that an electric motor is included, the electric motor operates using power generated by the electric motor connected to an internal combustion engine or power discharged from a secondary cell or a fuel cell. The vehicle M may be a vehicle in which plug-in charging of a battery is possible.

As shown in FIG. 1, the vehicle includes, for example, a driving source mechanism C, a gear mechanism (gear box) 23, a driving wheel 25, a VCU 40, a battery 60, a battery sensor 62, a motive power controller 70, and a vehicle sensor 78.

The driving source mechanism C is a mechanism that generates driving power of the vehicle M. The driving source mechanism C includes some or all of, for example, an internal combustion engine, a traveling electric motor, a power generation electric motor, a gear shift control mechanism, and an AC-DC converter. The details of the driving source mechanism C will be described later.

The gear mechanism 23 is connected to the driving wheel 25, increases, decreases, or reverses the traveling motive power output by the driving source mechanism C by matching the engine speed or a rotating force (torque) from the driving source mechanism C or the battery 60 with a traveling condition, and outputs the traveling motive power to the driving wheel 25. A part (the traveling electric motor and the power generation electric motor) of the driving source mechanism C and the gear mechanism 23 are disposed in the same casing 90 that is filled with a heat exchange medium (lubricant) 91.

The VCU 40 is, for example, a DC-DC converter. The VCU 40 boosts power supplied from the battery 60 and outputs the power to the driving source mechanism C.

The battery 60 is a storage battery that stores plug-in-charged power by an external power supply or power generated by the driving source mechanism C. The battery 60 is, for example, a secondary cell such as a lithium ion battery. The battery 60 supplies power to the driving source mechanism C.

The battery sensor 62 is mounted on the battery 60 and senses derivation source information regarding a charge amount (for example, state of charge (SOC) (charging rate), a state of health (SOH: degradation state), state of power (SOP: chargeable or dischargeable power)) of the battery 60.

The motive power controller 70 performs motive power control related to traveling of the vehicle M. The motive power controller 70 includes, for example, a hybrid controller 71, an engine controller 72, a motor controller 73, a brake controller 74, and a battery controller 75. The hybrid controller 71 outputs control commands to the engine controller 72, the motor controller 73, the brake controller 74, and the battery controller 75. Instructions given by the hybrid controller 71 will be described below.

The engine controller 72 performs ignition control, throttle opening control, fuel injection control, fuel cut control, and the like of an internal combustion engine of the driving source mechanism C in response to control commands from the hybrid controller 71. The engine controller 72 may calculate an engine speed based on an output of a crank angle sensor mounted on a crank shaft and output the calculated engine speed to the hybrid controller 71.

The motor controller 73 performs switching control of the converter, the traveling electric motor, and the power generation electric motor of the driving source mechanism C in response to an instruction from the hybrid controller 71.

The motor controller 73 acquires a motor speed and a torque of each of the traveling electric motor and the power generation electric motor and reads power consumption of each of the traveling electric motor and the power generation electric motor from the loss map based on a boosting voltage by the VCU 40 to be further described. A loss map indicates loss identification of a copper loss, an iron loss, or the like of the traveling electric motor and the power generation electric motor and defines outputable ranges of the traveling electric motor and the power generation electric motor.

Further, the motor controller 73 derives a slope of a temperature change curve of the heat exchange medium based on read power consumption of the traveling electric motor and the power generation electric motor and a heat resistance value of the heat exchange medium, and further derives a temperature increase amount of the heat exchange medium.

The motor controller 73 determines whether a warming-up process is performed based on the above-described temperature increase amount of the heat exchange medium, the SOC of the battery 60, an activation state of the internal combustion engine of the driving source mechanism C, or the like. The warming-up process is, for example, a process of controlling the traveling electric motor of the driving source mechanism C inefficiently (causing the traveling electric motor to generate heat) or controlling the power generation electric motor inefficiently. The inefficient control of the power generation electric motor may include a process of causing the power generation electric motor to rotate the internal combustion engine (power-wasting process). The power generation electric motor is an example of a "second electric motor."

For example, the motor controller 73 determines that the warming-up process is not performed in a case that the SOC of the battery 60 is less than a threshold, and determines that the warming-up process is performed in a case that the SOC of the battery 60 is equal to or greater than the threshold. At this time, in a case that the battery 60 is fully charged, it is determined that the power-wasting process by the power generation electric motor is performed in addition to the warming-up process by the traveling electric motor. The fact that the SOC of the battery 60 is equal to or greater than the threshold is an example of the fact that "a charge amount of a storage battery is a equal to or greater than a predetermined amount."

For example, in a case that the power-wasting process is performed during traveling of the vehicle M on an upslope, an increase in the temperature of the heat exchange medium during charging by a regenerative brake may be realized.

The brake controller 74 controls a brake device (not shown) in response to a control command from the hybrid controller 71. The brake device is a device that a brake torque in accordance with a brake operation of a driver is output to each wheel.

The battery controller 75 derives a power amount of the battery 60 based on a sensing result of the battery sensor 62 mounted on the battery 60 and outputs the power amount to the motive power controller 70 and the hybrid controller 71.

The vehicle sensor 78 includes, for example, an accelerator opening degree sensor, a vehicle speed sensor, and a brake step sensor. The accelerator opening degree sensor is mounted on, for example, an accelerator pedal which is an operator receiving an acceleration instruction from a driver. The accelerator opening degree sensor detects an operation amount of the accelerator pedal and outputs the operation amount as the degree of accelerator opening to the motive power controller 70. The vehicle speed sensor includes, for example, a speed calculator and a wheel speed sensor mounted on each wheel, integrates wheel speeds detected by the wheel speed sensors to derive a speed of the vehicle (vehicle speed), and outputs the vehicle speed to the motive power controller 70. The brake step sensor is mounted on a brake pedal which is an example of an operator receiving a deceleration or stopping instruction from the driver, detects an operation amount of the brake pedal, and outputs the operation amount as a brake depression amount to the motive power controller 70.

Control by the hybrid controller 71 will be described. The hybrid controller 71 first determines a driving shaft request output based on the degree of accelerator opening and the vehicle speed. The hybrid controller 71 determines necessity or non-necessity for activation of an engine 10, engine power of the engine 10 to be output, an amount of generated power of the power generation electric motor by a power generator, and an output amount of the traveling electric motor based on the determined driving shaft request output, power consumption of an auxiliary engine or the amount of power of the battery 60, the degree of accelerator opening acquired from the vehicle sensor 78, the vehicle speed, and the like.

The hybrid controller 71 outputs the determined information to the engine controller 72 and the motor controller 73. In a case that a driver operates a brake, the hybrid controller 71 determines an allocation of a brake torque which can be output by regeneration of the traveling electric motor included in the driving source mechanism C and a brake torque which is output by the brake device and outputs the allocation of the brake torques to the motor controller 73 and the brake controller 74.

In the following description, a generic term of a device that delivers motive power generated by the driving source mechanism C such as the gear mechanism 23, a clutch (not shown), or a driving shaft (not shown) to the driving wheel 25 is a "power train" in some cases.

[Heat Exchange Medium]

Figure 2:
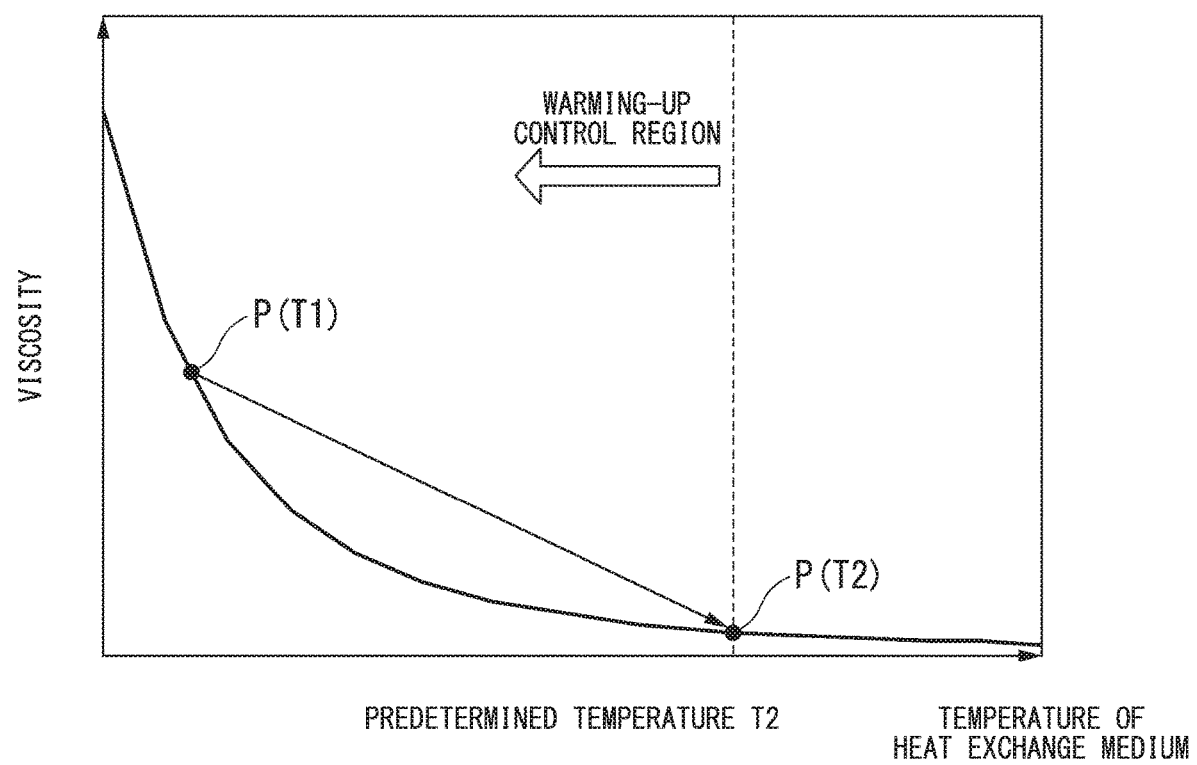
FIG. 2 is a graph showing an example of a relation between a temperature and viscosity of a heat exchange medium.

FIG. 2 is a graph showing an example of a relation between a temperature and viscosity of the heat exchange medium. As the heat exchange medium, an automatic transmission fluid (ATF) which is an operating fluid used for gear lubrication, motive power delivery, or the like is appropriately used.

The viscosity and temperature of the heat exchange medium have a relation similar to an inverse proportional curve, as shown in FIG. 2. That is, viscosity of the heat exchange medium is large at the time of low temperature. However, the viscosity gradually decreases as the temperature increases. In a case that the temperature exceeds a predetermined temperature (hereinafter referred to as a predetermined temperature T2), a decrease amount of the viscosity tends to slow considerably. Accordingly, in a case that a temperature (for example, a current temperature T1 in the drawing) of the heat exchange medium is less than the predetermined temperature T2, the motive power controller 70 controls the power train, particularly, the traveling electric motor or the power generation electric motor, so that the temperature is equal to or greater than the predetermined temperature T2. In the following description, control of the power train by the motive power controller 70 so that the temperature of the heat exchange medium is equal to or greater than the predetermined temperature T2 is referred to as "warming-up control" in some cases.

The temperature (temperature increase amount) of the heat exchange medium may be an actually measured value or may be an estimated value based on an actually measured value of the temperature of the other device. In a case that the temperature is an actually measured value, a temperature sensor or the like is installed in a casing in which the gear mechanism 23 is stored.

[Temperature Increase Point]

In a case that the temperature of the heat exchange medium is less than the predetermined temperature T2, the motor controller 73 changes an operating point of the traveling electric motor or the power generation electric motor to a temperature increase point. The temperature increase point is a combination of a target current value and a target voltage value at which an increase in temperature is larger than that of motive power output by the motor and is an operating point on a stronger field side rather than a maximum efficiency point. For example, the motive power controller 70 determines to change an operating point to a temperature increase point for the purpose of increasing the temperature of the heat exchange medium by causing the traveling electric motor or the power generation electric motor to generate heat, increases or boosts a current flowing in the traveling electric motor or the power generation electric motor.

Figure 3:
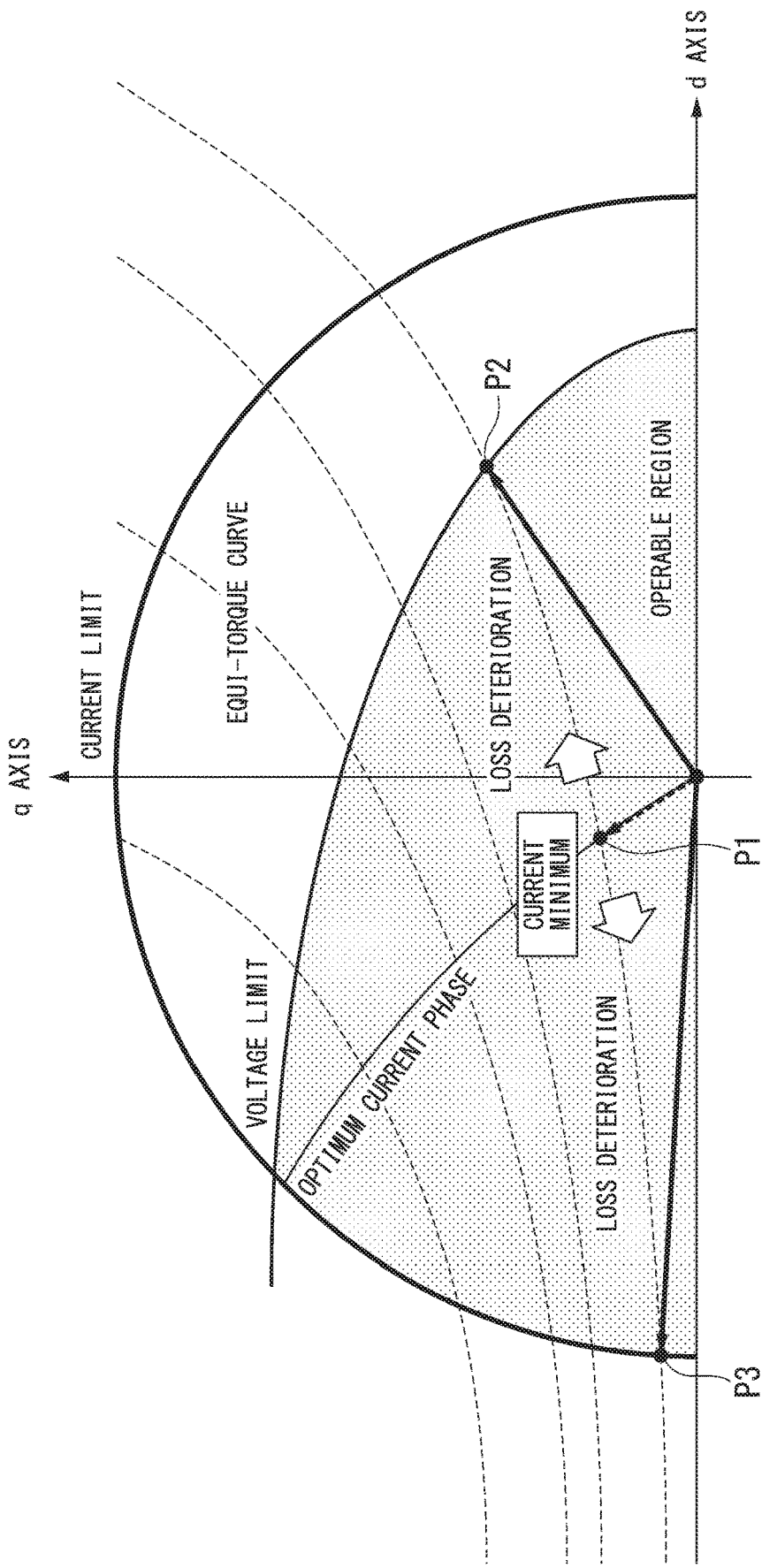
FIG. 3 is a diagram showing a temperature increase point.

FIG. 3 is a diagram showing a temperature increase point. As shown in FIG. 3, the motor controller 73 derives an operating point based on a current, a voltage, an optimum current phase, and an equi-torque curve of the traveling electric motor in a dq axis current vector space. In FIG. 3, an operable region (a region including an operating point) can be defined by a voltage limit and a current limit on a q axis (which is an axis representing a torque) and a d axis (which is an axis representing a change in a field). Further, a point at which an optimum current phase is realized on an equi-torque curve within the operable region is set as an operating point at the normal time. The optimum current phase indicates a phase in which a torque generated at the same current is a maximum.

An operating point P1 in FIG. 3 is an operating point considered to be a target at the normal time. On the other hand, an operating point P2 is an operating point considered to be a target at the time of performing warming-up control and is an operating point of a current minimum which is an intersection of the equi-torque curve and the optimum current phase within the operable region. Since an operation at the operating point P2 is subjected to inefficient control, an amount of heat generated in the traveling electric motor increases. The operating point P2 is an example of a "temperature increase point."

For example, the motor controller 73 performs stronger field control as part of a warming-up process. The stronger field control is control in which a loss portion is guaranteed so that a loss is a maximum at an operating point of the same torque and a d-axis current of the traveling electric motor increases to a positive value.

The motive power controller 70 drives the traveling electric motor at an operating point P2 at which a current is a maximum by boosting up a voltage V2 applied to the traveling electric motor by the VCU 40 and performing stronger field control, for example, in a case that the traveling electric motor is run reversely to reversely drive an internal combustion engine. An operable range of the traveling electric motor is expanded by boosting the voltage V2 to be applied to the traveling electric motor by the VCU 40. In the traveling electric motor subjected to the stronger field control, output efficiency decreases and an amount of generated heat increases mainly due to a copper loss.

Even in a case that weaker field control for driving at an operating point P3 (current limit) is performed, warming-up is similarly realized. However, since demagnetization of a magnet arises in an electric motor, control at the operating point P2 (voltage limit) at which a magnetic field in a magnetization direction is provided is performed in the embodiment.

[Temperature of Heat Exchange Medium]

Figure 4:
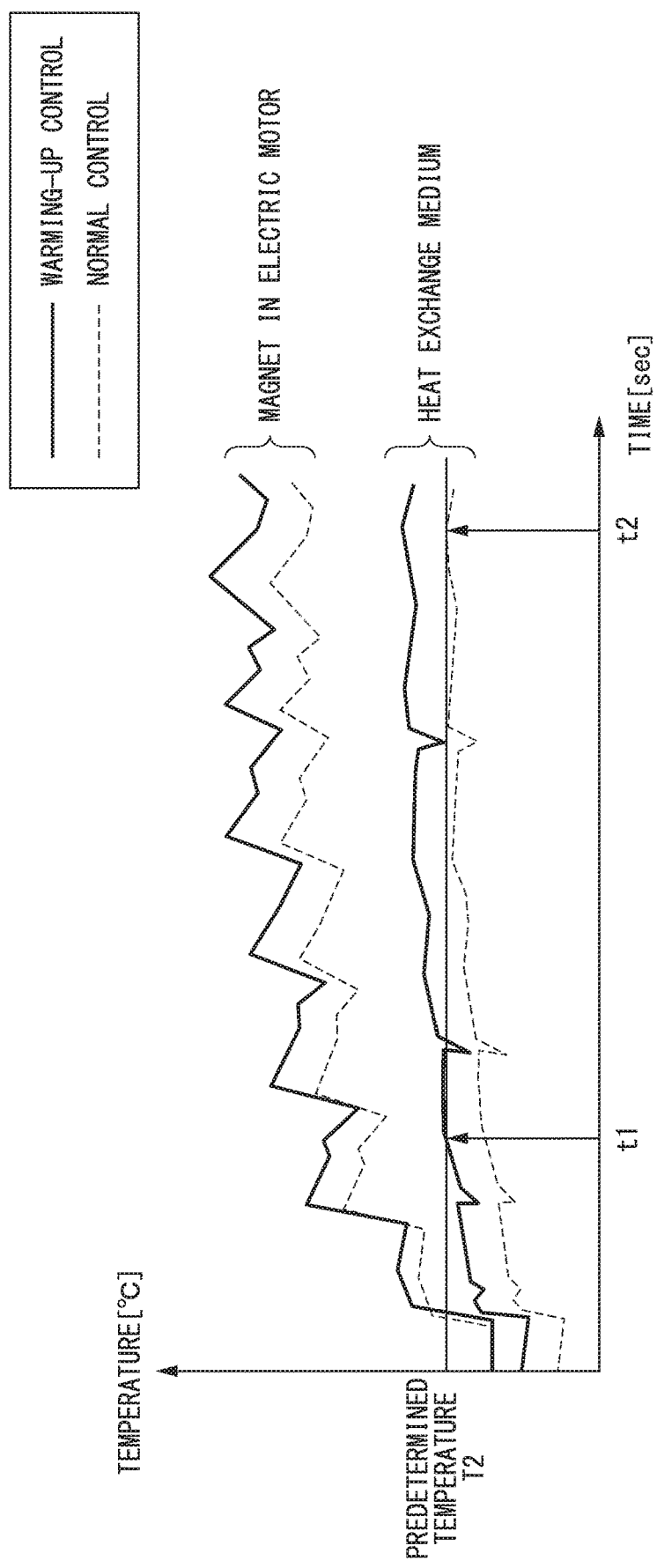
FIG. 4 is a graph showing a temperature transition example of the heat exchange medium in a case that a motive power controller controls the temperature increase point.

FIG. 4 is a graph showing a temperature transition example of the heat exchange medium in a case that the motive power controller 70 controls the temperature increase point. In FIG. 4, transitions of temperatures of the heat exchange medium and a magnet in the traveling electric motor at the time of warming-up control are indicated by solid lines and transitions of temperatures of the heat exchange medium and the magnet in the electric motor at the time of normal control are indicated by dotted lines. A temperature of a coil or an electromagnetic steel in an electric motor has a similar tendency to a temperature of a magnet (not shown).

As shown in FIG. 4, in a case that warming-up control is performed, a temperature of the magnet of the traveling electric motor increases faster than in a case that the warming-up control is performed at the time of normal control. Therefore, the temperature of the heat exchange medium increases faster and exceeds the predetermined temperature T2 at time t1. Therefore, the motive power controller 70 determines that the warming-up process may end at time t1 (or later). In a case that the motive power controller 70 periodically predicts a temperature which the heat exchange medium attains and determines necessity or non-necessity of the warming-up process, the motive power controller 70 may predict a time at which the temperature exceeds a temperature of the heat exchange medium or the predetermined temperature T2 (hereinafter referred to as an attainment-predicted time) even before time t1. In a case that the attainment-predicted time is within a predetermined time (for example, a time before the process of determining necessity or non-necessity of the warming-up process is subsequently started), the warming-up process may be ended at that time.

The motor controller 73 determines necessity or non-necessity of the warming-up process and a time at which the warming-up process is performed based on the attainment-predicted time, a difference between the predetermined temperature T2 and a current temperature of the heat exchange medium, and the above-described temperature increase amount of the heat exchange medium.

On the other hand, at the time of normal control, an increase in temperatures of the magnet and the heat exchange medium tends to be gentle. Therefore, the temperature of the heat exchange medium exceeds the predetermined temperature T2 at time t2.

As shown in FIG. 2, since the heat exchange medium at the time of low temperature has high viscosity, a traveling energy loss in the driving source mechanism C is estimated to arise at a considerable ratio. On the other hand, in a case that the warming-up control is performed, a traveling energy loss in the driving source mechanism C can be said to decrease since the viscosity of the heat exchange medium is sufficiently lowered at time t1.

[Process Flow]

Figure 5:
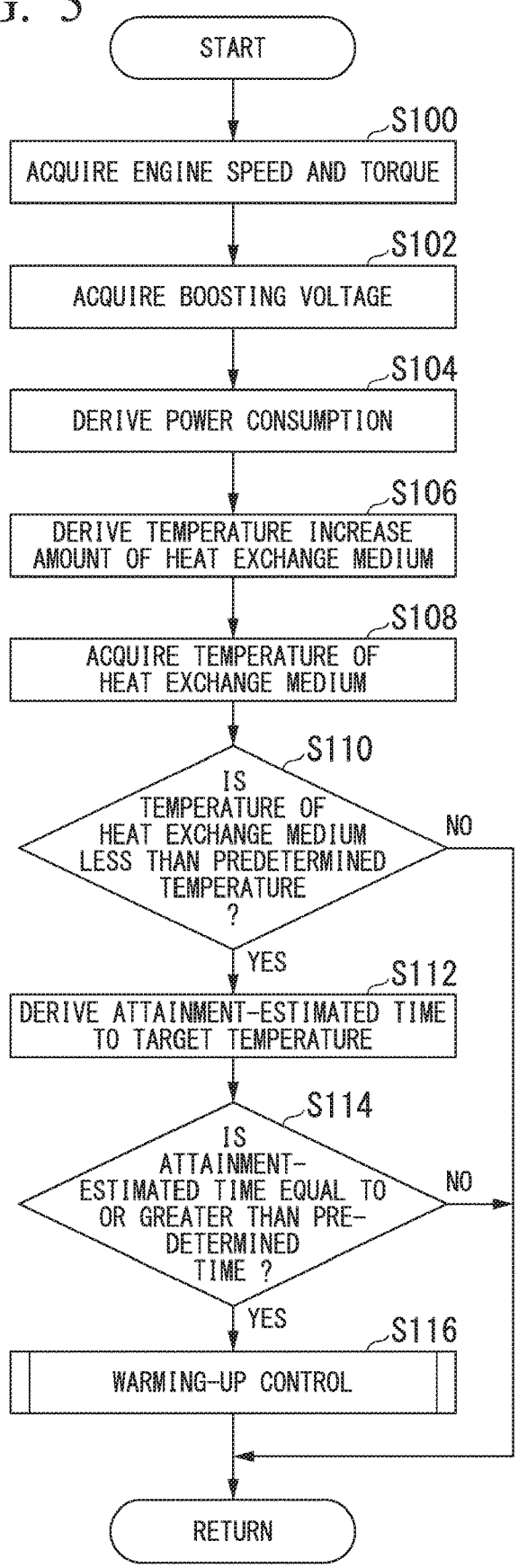
FIG. 5 is a flowchart showing an example of a flow of a determination process in the motive power controller.

FIG. 5 is a flowchart showing an example of a flow of a determination process in the motive power controller 70. The flowchart shown in FIG. 5 may be repeatedly performed for each predetermined constant time, for example.

First, the motive power controller 70 acquires the engine speed and a torque of the traveling electric motor or the power generation electric motor (step S100). Subsequently, the motive power controller 70 acquires the voltage V2 by the VCU 40 (step S102). Subsequently, the motive power controller 70 derives a power consumption amount of the driving source mechanism C (in particular, the traveling electric motor or the power generation electric motor) (step S104).

Subsequently, the motive power controller 70 derives a temperature increase amount of the heat exchange medium (or a temperature or a temperature increase amount of another device used to estimate the temperature increase amount) (step S106) and acquires the temperature of the heat exchange medium (step S108). Subsequently, the motive power controller 70 determines whether the temperature of the heat exchange medium is less than the predetermined temperature T2 (step S110). In a case that the temperature of the heat exchange medium is equal to or greater than the predetermined temperature T2, the process of the flowchart ends. In a case that the temperature is less than the predetermined temperature T2, the motive power controller 70 derives an attainment-predicted time at which the temperature of the heat exchange medium is predicted to reach the predetermined temperature T2 (step S112).

Subsequently, the motive power controller 70 determines whether the attainment-predicted time is equal to or greater than the predetermined time (step S114). In a case that the motive power controller 70 determines that the attainment-predicted time is equal to or greater than the predetermined time, the motive power controller 70 performs the warming-up process (step S116). In a case that the motive power controller 70 determines that the attainment-predicted time is not equal to or greater than the predetermined time, the description of the process of the flowchart ends.

Figure 6:
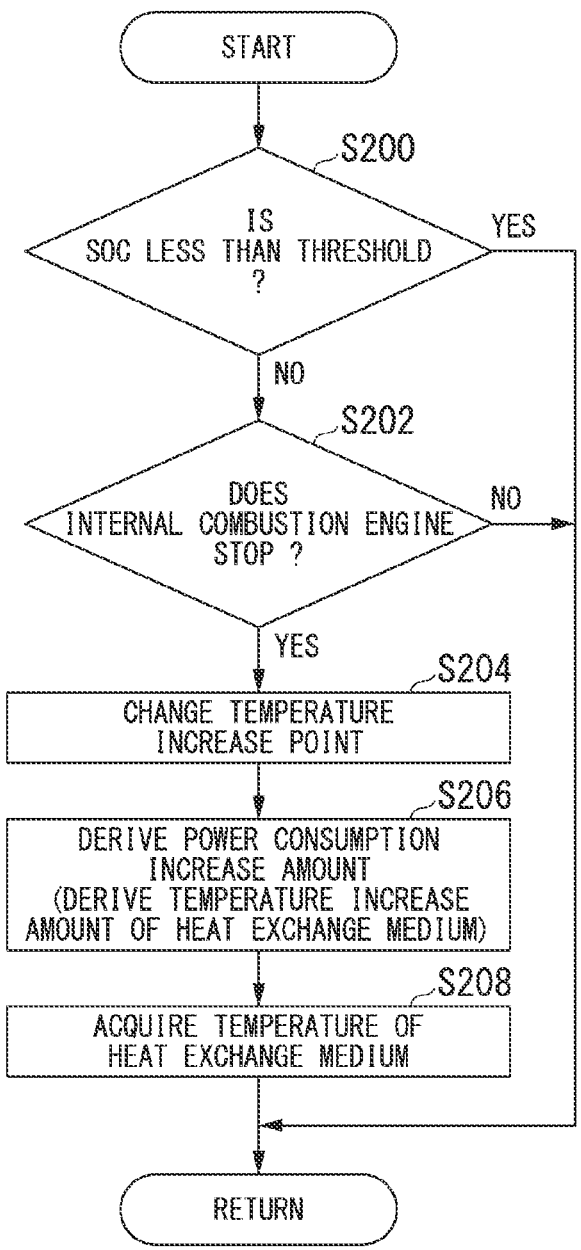
FIG. 6 is a flowchart showing an example of a flow of a warming-up control process by the motive power controller.

FIG. 6 is a flowchart showing an example of a flow of a warming-up control process by the motive power controller 70.

First, the motive power controller 70 determines whether the SOC of the battery 60 is less than a threshold (step S200). In a case that the SOC is less than the threshold, the process ends. In a case that the SOC is equal to or greater than the threshold, the motive power controller 70 determines whether the internal combustion engine of the driving source mechanism C stops (step S202). In step S202, it may be determined whether the internal combustion engine is included in the driving source mechanism C. In a case that the internal combustion engine does not stop, the process ends. In a case that the internal combustion engine stops, the motive power controller 70 changes the temperature increase point (step S204). Step S204 includes a process in which the motive power controller 70 determines whether to perform only the warming-up process by the traveling electric motor or perform a power-wasting process together by the power generation electric motor.

Subsequently, the motor controller 73 derives a power consumption increase amount (step S206). In step S206, the motor controller 73 may further derive a temperature increase amount of the heat exchange medium. Subsequently, the motive power controller 70 acquires a temperature of the heat exchange medium (step S208). Then, the description of the process of the flowchart ends.

[Driving Source Mechanism]

FIGS. 7 to 11 are diagrams showing kinds of the driving source mechanism C of the vehicle M. The driving source mechanism C of the vehicle M is realized, for example, in forms of the driving source mechanism C1 to C5. Thick solid lines in FIGS. 7 to 11 indicate mechanical connections and dotted lines indicate power wirings.

The driving source mechanism C according to the embodiment may be a series system, a parallel system, or a split system.

Figure 7:
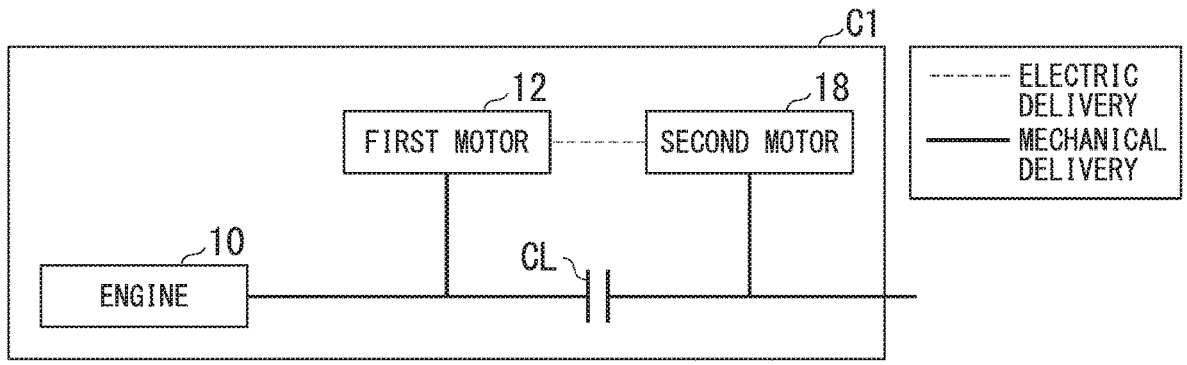
FIG. 7 is a diagram showing a disposition example of an internal combustion engine and a traveling electric motor of a vehicle according to the embodiment.

The parallel system is a system in which the engine 10 and the driving wheel 25 are mechanically connected and one of powers generated by the engine 10 and a first motor 12 is supplied to the traveling electric motor. FIG. 7 schematically shows a driving source mechanism of a parallel system.

Figure 9:
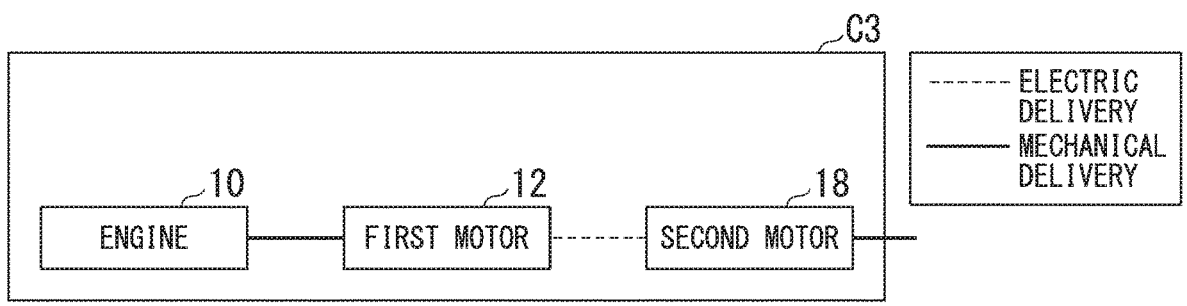
FIG. 9 is a diagram showing a disposition example of an internal combustion engine and a traveling electric motor of a vehicle according to the embodiment.
Figure 10:
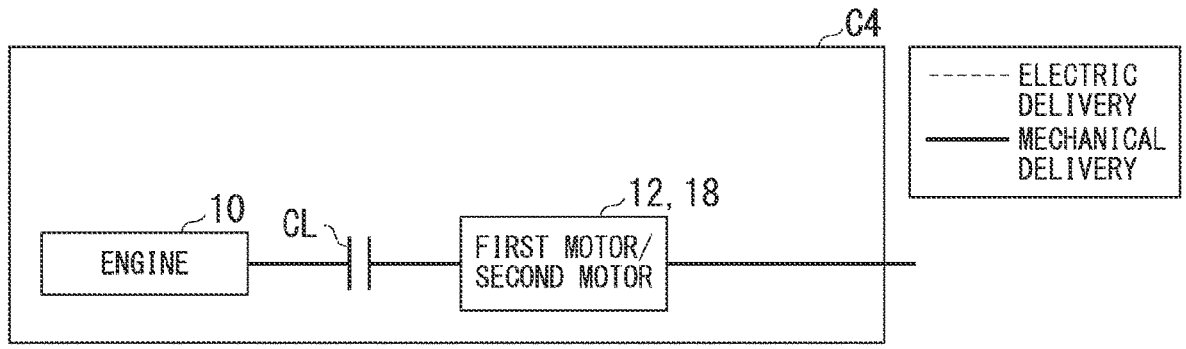
FIG. 10 is a diagram showing a disposition example of an internal combustion engine and a traveling electric motor of a vehicle according to the embodiment.
Figure 11:
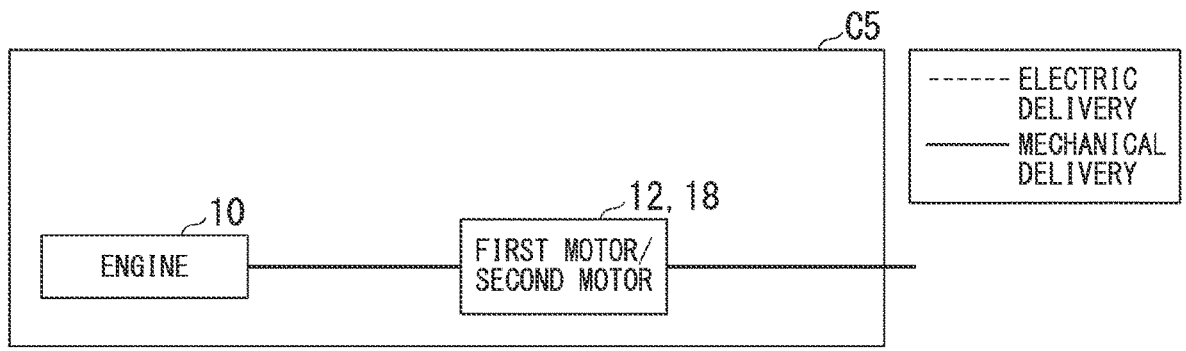
FIG. 11 is a diagram showing a disposition example of an internal combustion engine and a traveling electric motor of a vehicle according to the embodiment.
Figure 12:
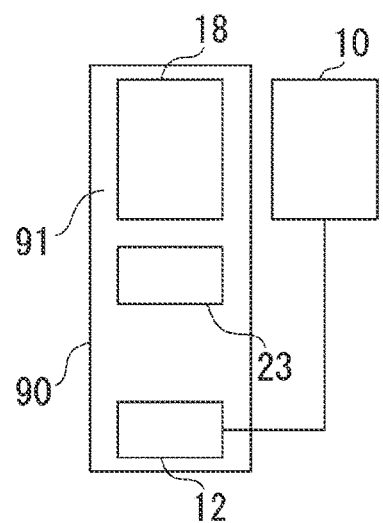
FIG. 12 is a diagram showing a casing filled with a heat exchange medium.

On the other hand, the series system is a system in which the engine 10 and the driving wheel 25 are not mechanically connected and motive power of the engine is used for the electric motor to generate power and power generated by the electric motor is supplied to the traveling electric motor. FIGS. 9 to 11 schematically shown riving source mechanisms of the serial system.

Figure 8:
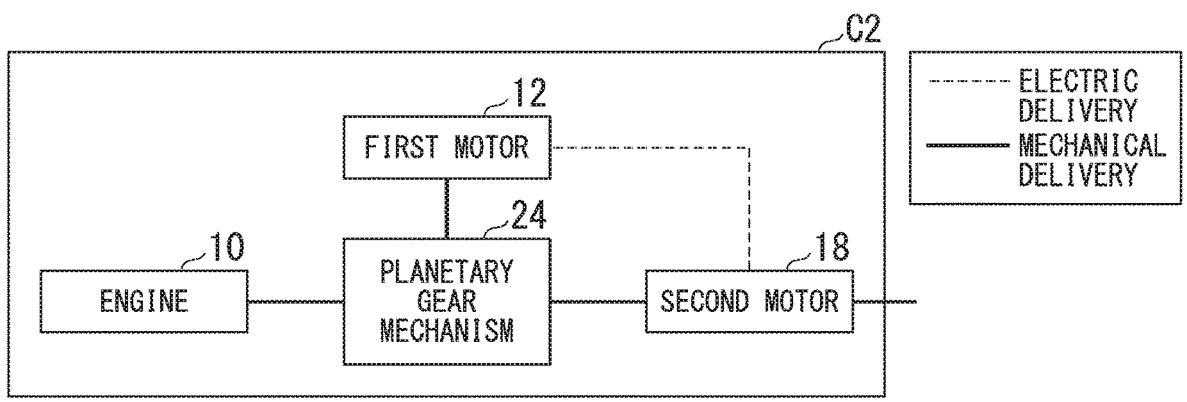
FIG. 8 is a diagram showing a disposition example of an internal combustion engine and a traveling electric motor of a vehicle according to the embodiment.

The split system is a system in which characteristics of the foregoing series system and the parallel system are combined and is also referred to as a serial-parallel system in some cases. In the split system, the vehicle M can be caused to travel with only motive power of a second motor 18 or can be caused to travel with a combination of the motive power of the engine 10 and the second motor 18, and the vehicle M can be caused to travel while the battery 60 is further charged. FIG. 8 schematically shows a driving source mechanism of the split system.

The driving source mechanism C1 shown in FIG. 7 includes, for example, the engine 10, the first motor 12, the second motor 18, and a clutch CL.

The engine 10 is an internal combustion engine that outputs motive power by combusting a fuel such as gasoline. The engine 10 is, for example, a reciprocating engine that includes a cylinder, a piston, an intake valve, an exhaust valve, a fuel injection device, an ignition plug, a connecting rod, and a crank shaft. The engine 10 is, for example, a four-stroke engine, but another cycle system may be used. As The engine 10, any engine such as a diesel engine, a gas turbine engine, a rotary engine, or an external combustion engine may be used as long as the engine can generate motive power.

The first motor 12 is, for example, a three-phase AC motor. The first motor 12 is mainly used to generate power. In the first motor 12, a rotor is connected to an output shaft (for example, a crank shaft) of the engine 10 and motive power output by the engine 10 is used to generate power. In the following description, a combination of the engine 10 and the first motor 12 is referred to as a "power generation unit" in some cases.

The second motor 18 is a traveling electric motor that rotates the driving wheel 25. The second motor 18 is, for example, a three-phase AC motor. The second motor 18 performs driving and regeneration of a vehicle. The rotor of the second motor 18 is connected to the driving wheel 25. The second motor 18 outputs motive power to the driving wheel 25 using power supplied from the power generation unit or the battery 60. The second motor 18 generates power using kinetic energy of the vehicle in a case that the vehicle is decelerated. Hereinafter, a power generation operation by the second motor 18 is referred to as regeneration in some cases.

The clutch CL connects and disconnects motive power transmission to and from the driving wheel 25. The motive power controller 70 performs control such that the clutch CL is opened (motive power is cut off) in a case that the vehicle is traveling with motive power output by the second motor 18, and the clutch CL is connected in a case that the vehicle is traveling with motive power output by the engine 10.

The driving source mechanism C2 shown in FIG. 8 includes, for example, the engine 10, the first motor 12, the second motor 18, and a planetary gear mechanism 24.

The planetary gear mechanism 24 performs motive power division. The planetary gear mechanism 24 is a different gear mechanism from the gear mechanism 23 is controlled by the motive power controller 70 to realize motive power division in accordance with a traveling pattern so that motive power division appropriate for each traveling pattern, for example, at the time of departure, the time of low or moderate speed traveling, the time of constant speed traveling (the time of normal traveling), the time of sudden acceleration, the time of deceleration or braking, the time of charging, or the like of the vehicle M can be realized. The driving source mechanism C2 can charge the battery 60 with surplus motive power generated by the engine 10 in real time.

The driving source mechanism C2 generates motive power for the second motor 18 to which power is supplied by the battery 60 at the time of departure or the time of low or moderate speed traveling of the vehicle M. At this time, the planetary gear mechanism 24 directly drive the driving wheel 25 or drives the second motor 18 by dividing the motive power generated by the engine 10 at the time of constant speed traveling so that efficiency is a maximum. The driving source mechanism C1 may cause the first motor 12 to generate power by starting up the engine 10 so that the battery 60 may be charged.

The driving source mechanism C3 shown in FIG. 9 includes, for example, the engine 10, the first motor 12, and the second motor 18. The driving source mechanism C3 causes the vehicle to travel mainly using the motive power generated by the engine 10 at the time of traveling and motive power generated by the first motor 12 is used as auxiliary motive power. The driving source mechanism C3 is referred to as a range extender since a traveling distance is larger than a case in which the vehicle M is caused to travel using only the engine 10 in some cases.

The driving source mechanism C4 shown in FIG. 10 includes, for example, the engine 10, a motor-generator that functions as both the first motor 12 and the second motor 18, and the clutch CL.

In the case of connection with the driving source mechanism C4, the gear mechanism 23 may include a clutch in the own device. The driving source mechanism C4 can use only power generated by the motor-generator as motive power by opening the clutch CL and can also use power generated by the motor-generator and motive power by the engine 10 for traveling together by connecting the clutch CL.

The driving source mechanism C5 shown in FIG. 11 includes, for example, the engine 10 and the motor-generator that functions as both the first motor 12 and the second motor 18. Compared to the driving source mechanism C4 in FIG. 10, the driving source mechanism C5 does not include the clutch CL. Therefore, power generated by the motor-generator is used for assisting (for example, assisting at the time of acceleration of the vehicle M) of the motive power of the engine 10.

A casing in which the engine 10 is stored and a casing in which the second motor 18 is stored in the driving source mechanism C may be disposed adjacent to each other. Thus, the heat exchange medium of the second motor 18 can exchange heat with an engine oil (or cooling water) of the casing in which the engine 10 is stored. Thus, a time necessary for the warming-up process can be shortened compared to in a case that the casings are disposed at separate positions.

In a case that the casing in which the engine 10 is stored and the casing in which the second motor 18 is stored are disposed adjacent to each other, heat is exchanged with the engine oil from the heat exchange medium before the vehicle travels using motive power output by the engine 10. Thus, an improvement in emission or an improvement in fuel efficiency of the engine 10 is expected.

In FIGS. 7 to 11 described above, the driving source mechanisms C including the first motor 12 have been exemplified, but the driving source mechanism C of the vehicle M may be an electric vehicle that does not include the first motor 12 (the second motor 18 and the battery 60 are mounted).

According to the above-described embodiments, the vehicle includes the gear mechanism 23 connected to the driving wheel 25; the second motor 18 which is a traveling electric motor configured to exchange heat with a heat exchange medium shared by the gear mechanism 23 and output motive power to the driving wheel 25 via the gear mechanism 23; and the motive power controller 70 configured to change an operating point of the second motor 18 to a temperature increase point in a case that a temperature of the heat exchange medium is less than the predetermined temperature T2. Thus, it is possible to increase the temperature of the heat exchange medium faster during a cold time.

While preferred embodiments of the invention have been described and shown above, it should be understood that these are exemplary of the invention and are not to be considered as limiting. Additions, omissions, substitutions, and other modifications can be made without departing from the spirit or scope of the present invention.

Accordingly, the invention is not to be considered as being limited by the foregoing description, and is only limited by the scope of the appended claims.

What is claimed is:

1. A vehicle comprising:
a gear mechanism connected to a driving wheel;
a traveling electric motor configured to exchange heat with a heat exchange medium shared by the gear mechanism and output motive power to the driving wheel via the gear mechanism;
a storage battery configured to be charged from outside of the vehicle and supply power to the traveling electric motor; and
an internal combustion engine disposed adjacent to the traveling electric motor,
wherein the vehicle is configured to exchange heat between a heat exchange medium of the internal combustion engine and the heat exchange medium of the traveling electric motor, and
the vehicle further comprises a controller configured to derive an attainment-predicted time at which a temperature of the heat exchange medium of the traveling electric motor is predicted to reach a predetermined temperature in a case that the temperature of the heat exchange medium of the traveling electric motor is less than the predetermined temperature and a charge amount of the storage battery is equal to or greater than a predetermined amount, and configured to change an operating point of the traveling electric motor to a stronger field side rather than a maximum efficiency point in a case that the attainment-predicted time is equal to or greater than a predetermined time and the vehicle travels in a state where the internal combustion engine stops.

2. The vehicle according to claim 1, further comprising:
a second electric motor which is connected to the internal combustion engine and which undergoes heat exchange with the heat exchange medium of the traveling electric motor,
wherein the controller changes an operating point of the second electric motor to the stronger field side rather than the maximum efficiency point in a case that the temperature of the heat exchange medium of the traveling electric motor is less than the predetermined temperature.

3. The vehicle according to claim 1, further comprising:
a second electric motor which is connected to the internal combustion engine and which undergoes heat exchange with the heat exchange medium of the traveling electric motor,
wherein the controller changes operating points of the second electric motor and the traveling electric motor to the stronger field side rather than the maximum efficiency point in a case that the second electric motor rotates the internal combustion engine.

* * * * *